Nov 1, 1949.  C. L. CARELOCK  2,486,462
TRANSPLANTING MACHINE
Filed Jan. 22, 1948  5 Sheets-Sheet 5
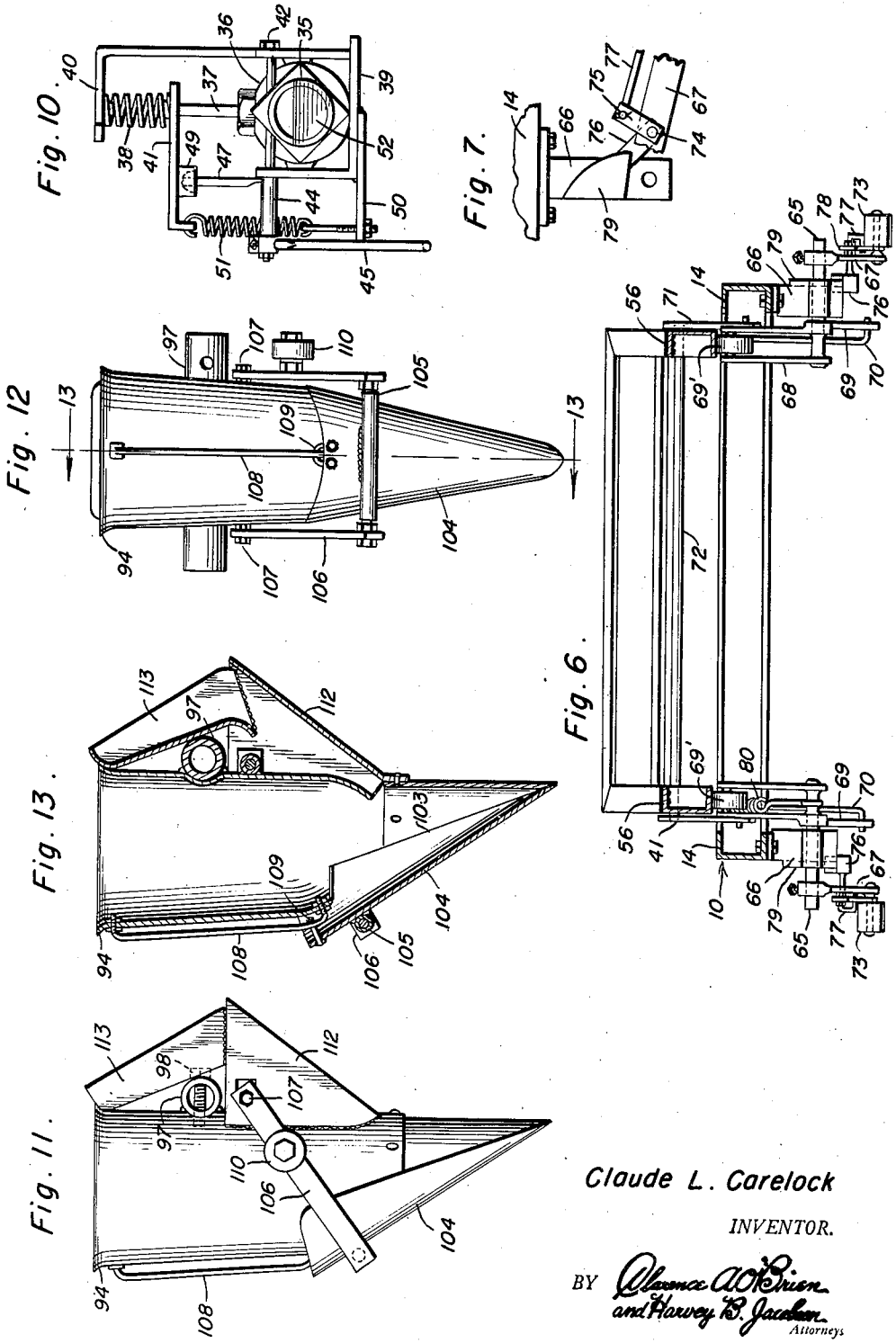
Claude L. Carelock
INVENTOR.

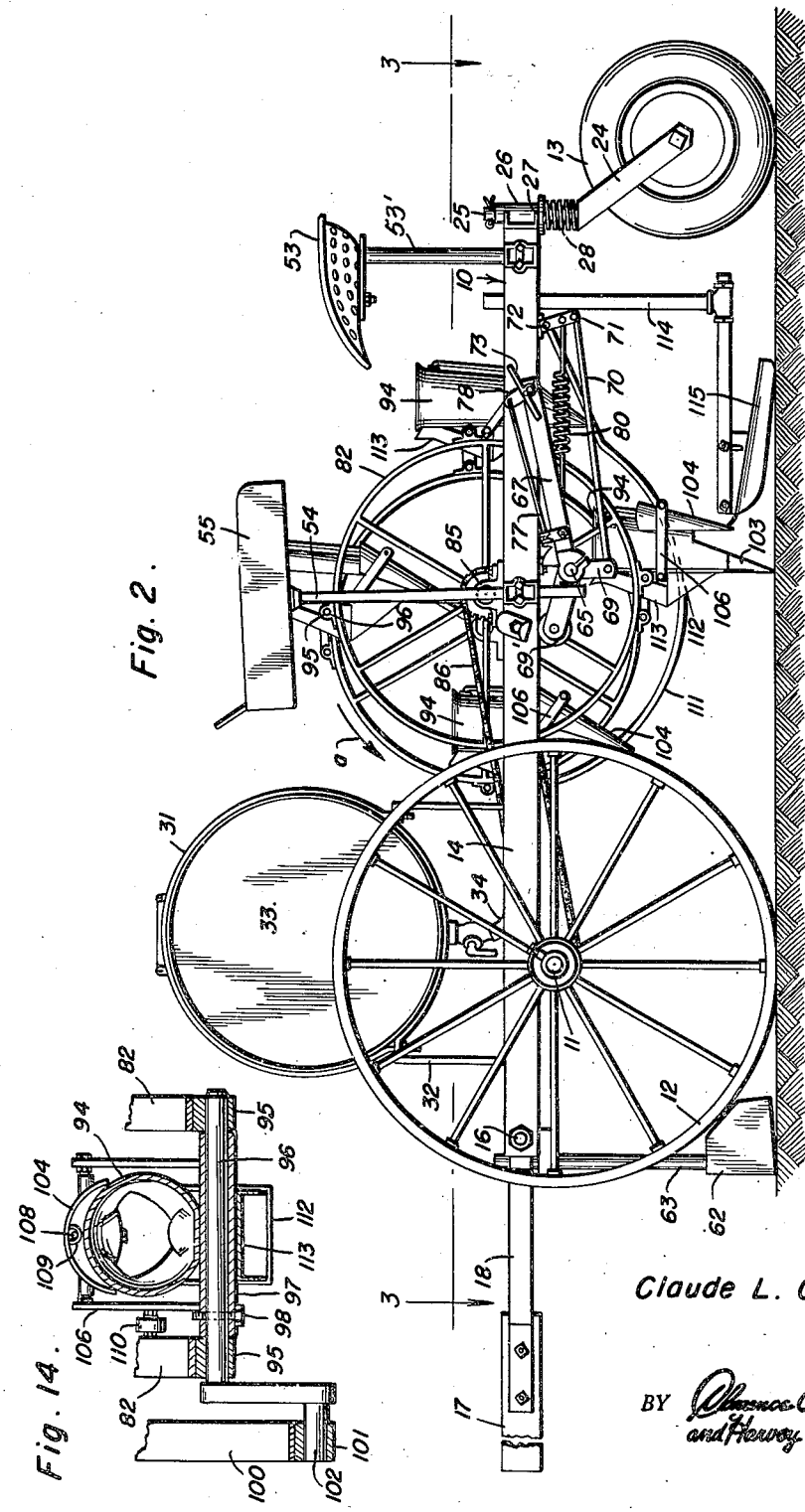

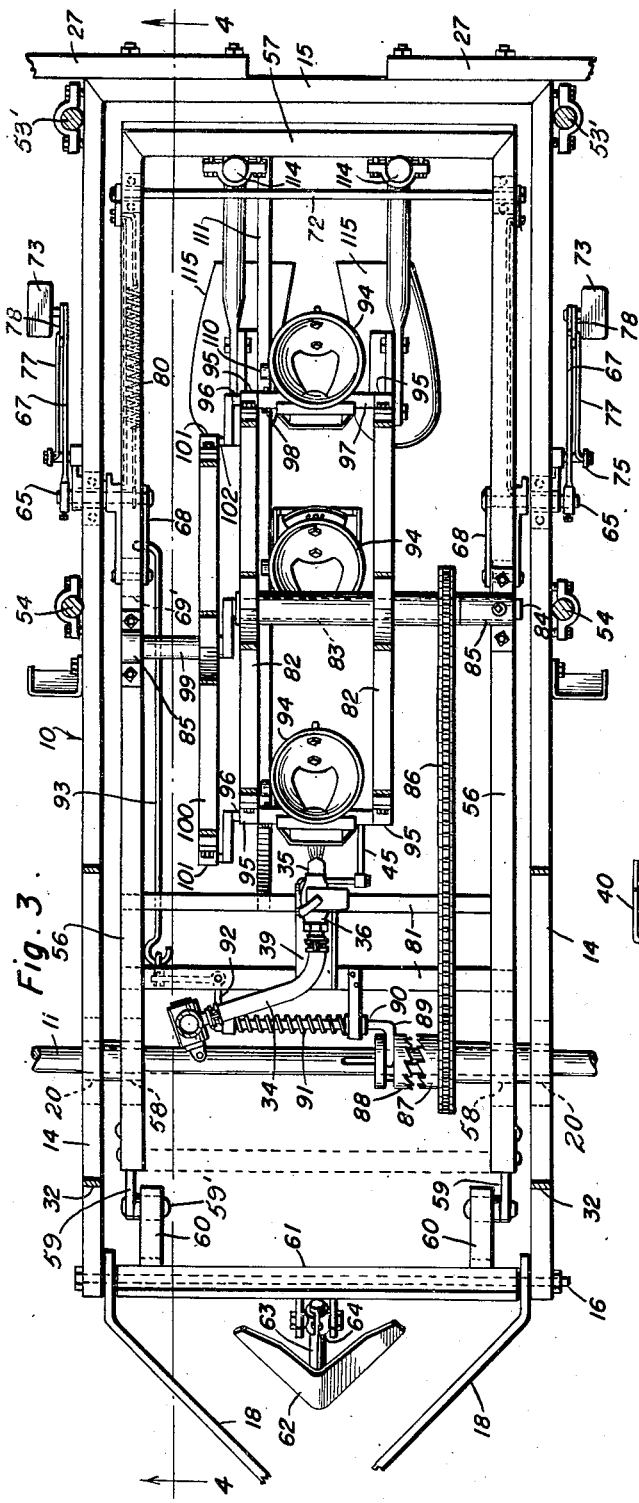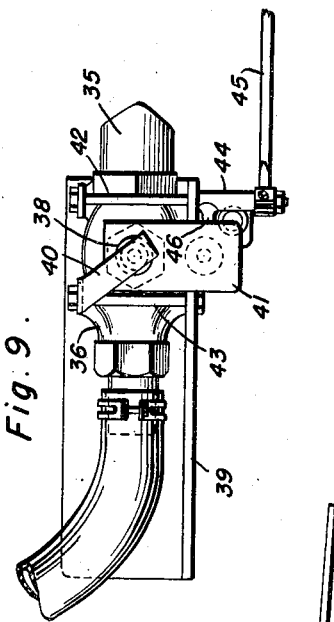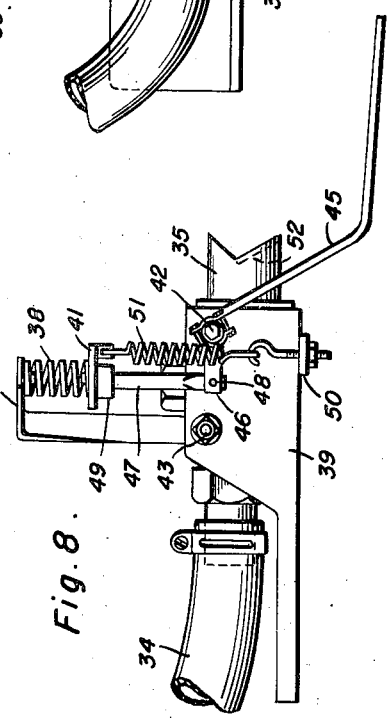
Claude L. Carelock
INVENTOR.

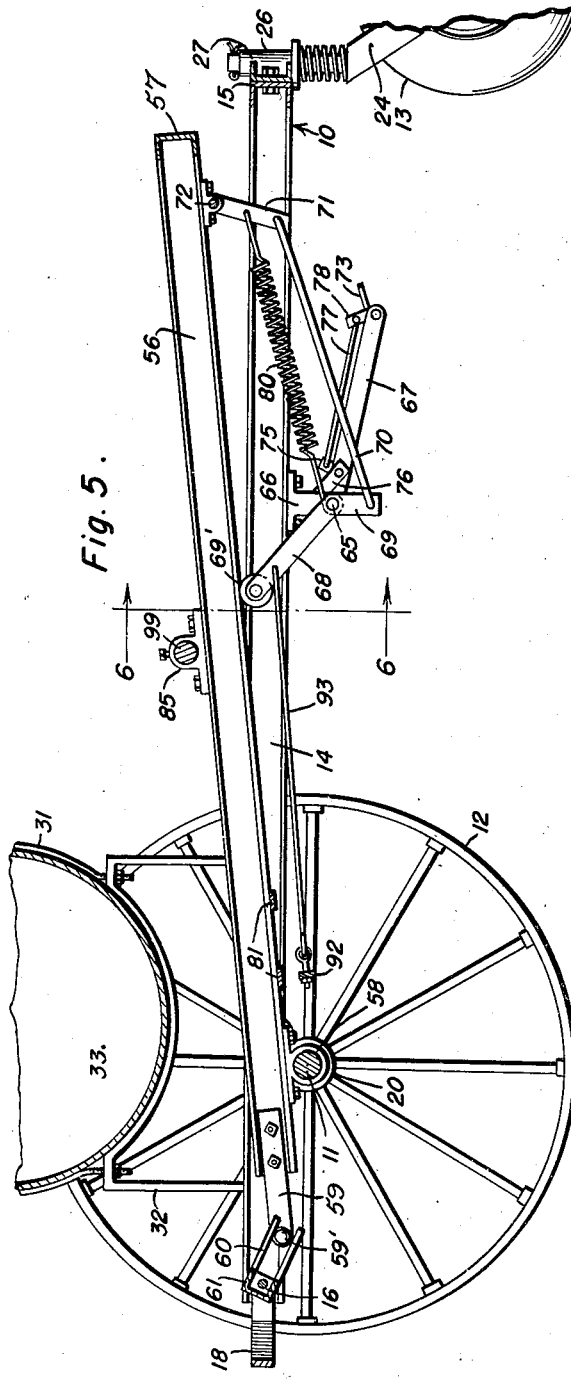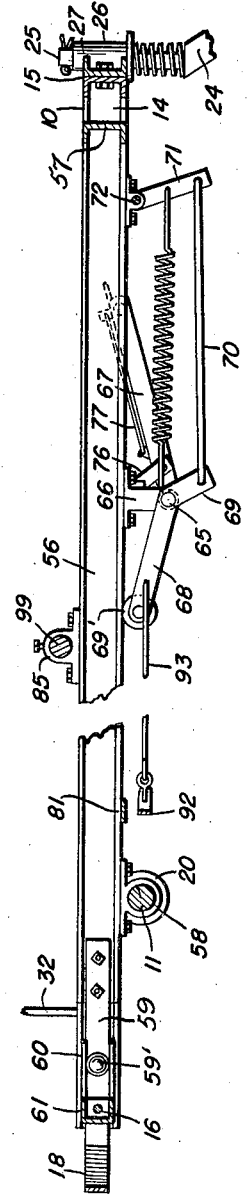
Fig. 5.
Fig. 4.
Claude L. Carelock
INVENTOR.

Patented Nov. 1, 1949

2,486,462

UNITED STATES PATENT OFFICE 2,486,462

TRANSPLANTING MACHINE

Claude L. Carelock, Douglas, Ga., assignor of one-half to Claude L. Carelock, Jr.

Application January 22, 1948, Serial No. 3,707

8 Claims. (Cl. 111—62)

1

This invention relates to transplanting machines of the type disclosed in my pending application for U. S. Letters Patent, Serial No. 721,244, filed January 10, 1947, and the primary object of the present invention is to generally simplify and improve the construction of the machine disclosed in that application.

Another object of the present invention is to provide a planting wheel including improved plant-receiving buckets.

A further object of the present invention is to provide an improved sub-frame and mounting for the ground leveling plow, the planting wheel, and the earth packing elements.

Still another object of the invention is to provide improved pedal operated means for swinging the sub-frame upwardly so as to raise the ground leveling plow, the planting wheel, and the earth packing elements to an inoperative position, and to hold them in such position.

Still another object of the invention is to provide novel means for rendering the driving means for the planting wheel inoperative when the sub-frame is swung upwardly, and for rendering the same operative when the sub-frame is allowed to lower.

Yet another object of the invention is to provide improved means for automatically delivering water to the plant in each bucket of the planting wheel just before the plant is set in the ground.

The exact nature of the present invention will become apparent from the following description when considered in connection with the accompanying drawings, in which:

Figure 2 is a side elevation thereof;

Figure 3 is a horizontal section taken substantially on line 3—3 of Figure 2 with parts omitted;

Figure 4 is a fragmentary longitudinal section, partly broken away taken on line 4—4 of Figure 3;

Figure 5 is a view somewhat similar to Figure 4, with the sub-frame in upwardly swung position;

Figure 6 is a transverse section taken on line 6—6 of Figure 5;

Figure 7 is a fragmentary side elevation showing details of the means for raising the sub-frame and holding it in raised position;

Figure 8 is an enlarged fragmentary side elevational view showing the valve controlled discharge spout for the outlet pipe of the water tank;

Figure 9 is a top plan view thereof;

2

Figure 1:
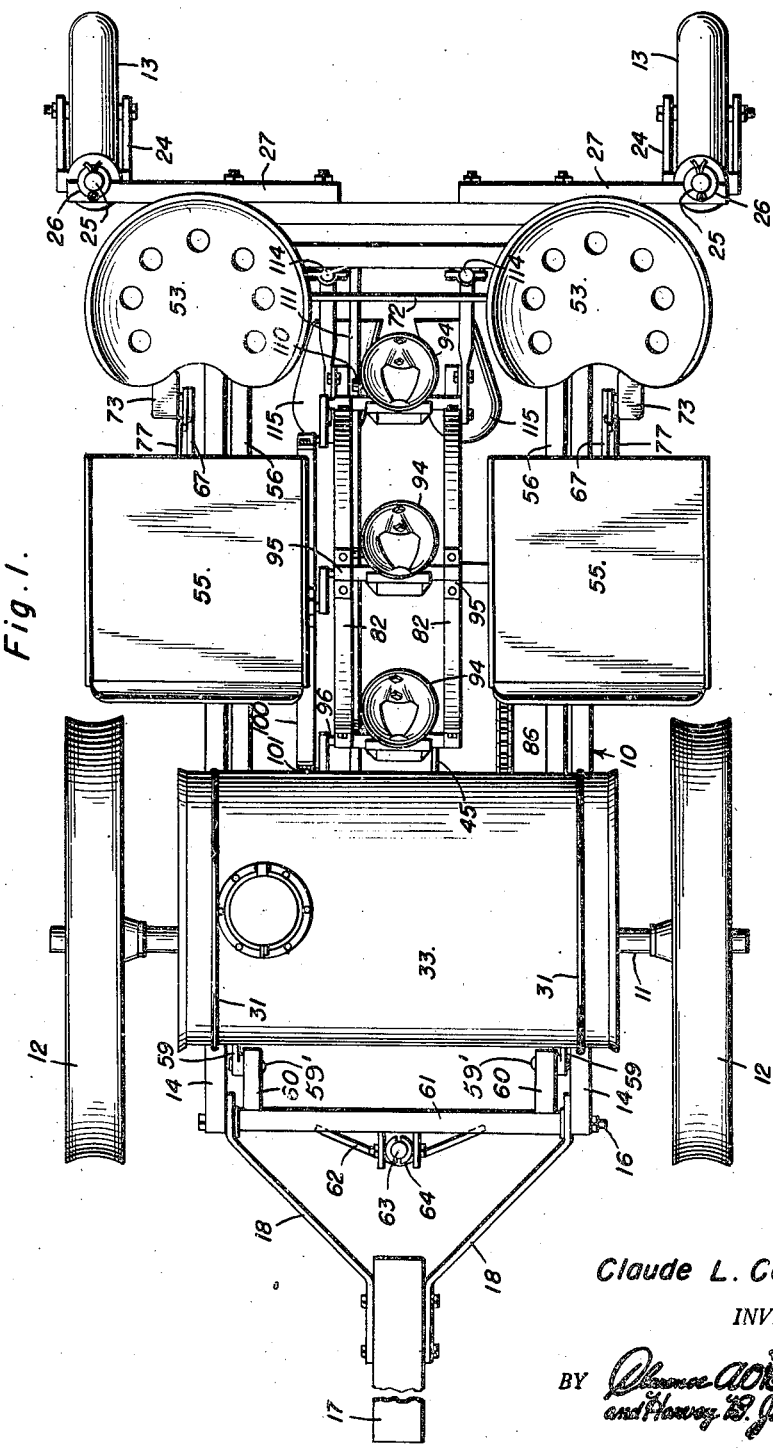
Figure 1 is a top plan view of a transplanting machine constructed in accordance with the present invention.

Figure 10 is an elevational view looking toward the left of Figure 8;

Figure 11 is an enlarged side elevational view of one of the plant receiving buckets;

Figure 12 is a rear elevation thereof;

Figure 13 is a vertical section taken on a line 13—13 of Figure 12; and

Figure 14 is an enlarged fragmentary section taken through one of the plant receiving buckets and adjacent portions of the planting wheel.

Referring in detail to the drawings, 10 indicates an open elongated main frame which is mounted near its front end upon a rotatable transverse axle 11 driven by supporting wheels 12 provided on the ends thereof. The rear end of the frame 10 is mounted upon caster wheels 13. Frame 10 includes spaced side rails 14 connected by a transverse rear rail 15 and by a transverse front tie rod or bolt 16. A draft tongue 17 is secured between the adjacent forward ends of forwardly converging straps 18 which are pivoted at their rear ends upon the rod or bolt 16 at the inner sides of the side rails 14. The side rails 14 carry bearings 20 in which axle 11 is journalled, and the usual ratchet driving connection, not shown, may be provided between each wheel 12 and the axle 11, so that said wheels will only drive the axle upon forward travel of the machine. The mount of each caster wheel 13 comprises a fork 24 in which the wheel is journalled, vertical post 25 rigid with the top of the fork 24 and rotatably and slidably extending through bearing 26 fixed to the outer end of bar 27, rigidly secured to the rear end of and projecting beyond the side of main frame 10, and a helical compression spring 28 disposed on the post 25 between the associated bearing 26 and fork 24. Thus, the springs 28 will cushion shocks incident to passage of the caster wheels over obstructions or inequalities in the ground surface.

Clamped at 31, in cradles 32, secured on the side rails 14, is a transversely disposed water tank 33 provided with a downwardly and rearwardly extending outlet pipe 34 having a rearwardly extending discharge spout 35 at its lower end located in front of and in longitudinal alignment with the plant buckets of a planting wheel hereinafter described. This spout 35 is carried by the outlet of a valve 36 attached to the lower end of pipe 34. Valve 36 is of the type having a reciprocating valve member provided with an upwardly extending stem 37 that is urged downwardly by a spring 38 to normally seat said valve member. Valve 36 is secured within a bracket 39 having an arm 40 overlying the stem 37, and the spring 38 is disposed between the arm 40 and the end of a plate 41 secured on the upper end of valve stem 37. Bolts 42 and 43 extend through the brackets 39 to firmly secure the valve 36 therein, and the bolt 42 projects beyond one side of bracket 39 and has a sleeve 44 journalled on the projecting end thereof. An angular operating lever 45 is secured on the outer end of sleeve 44 and extends downwardly and rearwardly therefrom. Sleeve 44 also has a forwardly extending arm 46 to which the lower end of a vertical push rod 47 is pivoted at 48. The upper end of push rod 47 is seated in a socket member 49 provided on the plane 41 intermediate its ends. The other or outer end of plate 41 is connected to a plate 50 which is fixed to the bottom of bracket 39, by means of a helical tension spring 51 which aids the spring 38 in seating the valve member and normally positioning the parts 41, 45 and 47, as shown. It will be apparent that by depression of lever 45, the sleeve 44 may be rocked to move the rod 47 upwardly against the action of springs 38 and 51 so as to thereby pull the stem 37 upwardly for unseating the movable valve member thereof. Water is then allowed to flow from tank 33 through pipe 34 and spout 35. When the lever 45 is released, the springs 38 and 51 promptly close the valve and shut off the flow of water from the tank. As indicated by dotted lines in Figure 8 and shown in Figure 10, the outlet end of spout 35 has its lower portion closed by a segmental plate 52 so as to restrict the volume of water discharged and thereby insure projection of the stream of water the desired distance rearwardly from the spout.

Two seats 53 are carried by standards 53' mounted on the rear ends of the side rails 14, said seats being in side-by-side relation and adapted to accommodate operators whose duty it is to insert a plant in each bucket as it moves upwardly and forwardly in front of said operators at the rear of the plant-setting wheel. Supported by standards 54 fixed to and rising from the side rails 14 are trays 55, respectively disposed in front of a different one of the seats 53 and adapted to receive supplies of plants to be set. Thus, the supplies of plants are within convenient reach of the operators occupying the seats 53.

Disposed within the area bounded by the main frame 10 is a sub-frame composed of spaced side rails 56 rigidly connected at their rear ends by a transverse rail 57. This sub-frame is pivotally mounted near its front end on the axle 11 for vertical swinging movement, by means of bearings 58 secured to the under sides of the rails 56. The forward ends of rails 56 terminate a short distance rearwardly of rod 16 of the main frame and have arms 59 fixed thereto which are provided with lateral forward end portions 59' loosely engaged between the arms of forks 60 which are rigid with and project rearwardly from a transverse bar 61 disposed about and journalled on the rod 16 and extending the entire distance between the pivoted rear ends of straps 18. A ground leveling plow 62 is carried by the bar 61 intermediate its ends, said plow being mounted on the lower end of a standard 63 whose upper end is adjustably attached as at 64 to said bar 61. The arrangement is such that when the rear end of the sub-frame is swung upwardly, the bar 61 is rocked about the rod 16 in a clockwise direction as viewed in Figure 5 so as to raise the plow 62 off the ground to an inoperative position, and when the rear end of said sub-frame is swung downwardly to a point where the sub-frame is horizontally disposed as shown in Figure 4, the bar 61 is rocked in the opposite direction to lower the plow 62 to operative position. To insure free operation and minimize friction, the lateral ends of arms 59 preferably have rollers journalled thereon for engagement in the forks 60.

Foot operated means is provided for raising the rear end of the sub-frame and for holding it in raised position. Such means includes transverse rock shafts 65 journalled in bearing brackets 66 secured to the under sides of the side frame rails 14 of the main frame 10, each rock shaft 65 having a foot lever 67 secured on the outer end thereof. Each foot lever 67 projects rearwardly at the outer side of the main frame 10 to a point within convenient reach of the operator or attendant occupying the seat 53 at the same side of the machine. Secured on the inner end of each shaft 65 is a bell crank lever including a forwardly extending forked arm 68 having a roller 69 journalled in the free end thereof and bearing on the under side of the adjacent side frame rail 56 of the sub-frame. The other arm 69 of each bell crank lever extends downwardly and is connected by a rod 70 to a depending arm 71 secured on the adjacent end of a transverse rock shaft 72 which is journalled on the under side of the sub-frame near the rear end of the latter and extends from side to side thereof. It will thus be seen that when either foot lever 67 is depressed, the other will be simultaneously depressed for simultaneously raising arms 68 of both bell crank levers so as to swing the rear end of the sub-frame upwardly from the lowered position of Figure 4 to the raised position of Figure 5. Means is provided to releasably hold the sub-frame in raised position, which means is operable by the pivoted pedals 73 of the foot levers 67. As shown, each foot lever 67 is provided near its pivoted end with a rock shaft 74 having an arm 75 and a dog 76 secured thereon, said arm 75 being connected with the pedal 73 of the associated foot lever by a rod 77 and an arm 78 rigid with the pedal. Carried by each bearing bracket 66 is a keeper plate 79 engageable by the dog 76 of the associated foot lever to hold the same depressed and to thereby hold the rear end of the sub-frame in raised position. Engagement of either dog with its associated keeper plate 79 is effected by forward tilting of the associated pedal 73, and either dog may be disengaged to allow the rear end of the sub-frame to lower by rearward tilting of the associated pedal 73. The raising of the rear end of the sub-frame is assisted by a helical tension spring 80 which connects one of the arms 71 with the rock shaft 65 at the same side of the machine, and this spring also acts to absorb shock incident to sudden lowering of the sub-frame when the same is released to lower by gravity. As will be later apparent, the sub-frame carries a planting wheel and means for packing earth around the plants as they are set in the ground by said planting wheel. Accordingly, the purpose of raising the sub-frame is to elevate the planting wheel and the earth packing elements to inoperative position at the same time that the ground leveling plow 62 is raised to inoperative position. Conversely, lowering of the sub-frame results in lowering of the planting wheel and the earth packing elements to operative position at the same time that the leveling plow 62 is lowered to operative position. The side frame rails 56 of the sub-frame are connected by spaced transverse bars 81 on which the bracket 39 for the valve 36 is secured.

The plant-setting mechanism includes a plant-setting wheel composed of spaced wheel members 82 connected by a hub 83 which is journalled on a transverse shaft 84 secured at its ends in brackets 85 fixed upon the side rails 56 of the sub-frame. The hub 83 has a projecting end which is operatively connected by a chain gearing 86 to a clutch member 87 journalled on the axle 11. Another clutch member 88 is slidably keyed on axle 11 and may be engaged with the clutch member 87 so as to transmit motion from said axle to the planting wheel. Conversely, driving of the planting wheel may be discontinued by disengaging clutch member 88 from clutch member 87. Means is provided for automatically engaging clutch member 88 with clutch member 87 when the sub-frame is lowered and for automatically disengaging said clutch member 88 from said clutch member 87 when the sub-frame is raised. The latter means includes a clutch shifting fork 89 provided on one end of a rod 90 mounted in a horizontal position for sliding movement transversely of the machine, said fork 89 being engaged in a groove of the clutch member 88. A spring 91 is provided to normally move the fork 89 in a direction to disengage the clutch member 88, and the other end of rod 90 is loosely pivoted to one end of a bell crank lever 92 pivoted on the underside of one of the bars 81. The other arm of bell crank lever 92 is connected to the arm 68 of one of the sub-frame raising levers, by means of a link 93. The arrangement is such that when the mentioned lever arm 68 swings forwardly and downwardly to allow the sub-frame to lower, motion is transmitted to the fork 89 for engaging the latter, the link 93 swinging lever 92 and moving rod 90 against the action of spring 91. When the sub-frame is raised, link 93 is pulled rearwardly so as to disengage the clutch member 88 with the assistance of spring 91. Mounted on and located between the wheel members 82 adjacent the peripheries of the latter, are a plurality of equally spaced plant buckets 94. The wheel members 82 are provided with peripheral equally spaced transversely aligned pairs of bearings 95, and a crank shaft 96 is journalled in each pair of the bearings 95. A bucket 94 is secured on each rock shaft 96 between the wheel members 82. As shown, each plant bucket is provided across its front side with a fixed sleeve 97 which is fitted on the associated rock shaft 96 and secured thereto by suitable means as at 98. The shaft 84 has a forwardly offset end portion 99 on which is journalled a wheel 100 provided with peripheral bearings 101 in which are journalled the crank pins 102 of crank shafts 96. Thus, as the plant-setting wheel is rotated, the plant buckets are always maintained by the cranks of crank shafts 96 and wheel 100 in an upright position.

Each plant bucket 94 is of the dibble type and comprises an elongated tube cut away at the back of its lower portion to provide a rear opening in the latter and to form a pointed lower end which may readily pierce the ground to insure firm setting of the plant in the ground when earth is packed over the plant roots and as the bucket leaves the plant in moving rearwardly and upwardly. The numeral 103 indicates where the bucket is cut away to point its lower portion and to provide the rear opening. Each bucket is provided with a pivoted and bodily swinging closure plate 104 which is preferably of arcuate form in horizontal section. As shown, the closure plate 104 is pivoted at 105 upon the intermediate shaft portion of a U-shaped bail 106 which is hinged at its free ends as at 107 for vertical swinging movement and is disposed to embrace the bucket and its closure 104. Secured to the back of the upper portion of the bucket is a vertical guide rod 108 on which is slidable an eye member 109 fixed to and projecting inwardly from the upper end of the closure plate 104 intermediate the sides of the latter. The guide rod 108 and eye 109 act to pivot the closure plate 104 so as to swing it forwardly to proper closing position when fully lowered. The closure plate 104 of each bucket is automatically opened as said bucket reaches plant-setting position at the bottom of the planting wheel. For this purpose, the bail 106 is provided at one side with a roller 110 intermediate the adjacent end portion of the bail 106, said roller being arranged to ride on a cam track 111 carried by the sub-frame and extending below the planting wheel near one side of the latter. The roller 110 does not ride onto the track 111 until the associated bucket approaches its lower plant-setting position, and, after the bucket has completely left the set plant, said roller leaves the cam track 111 and allows the closure plate 104 to lower and close by gravity.

Each plant bucket 94 is provided at the front with an inlet spout 112 into which water from the discharge spout 35 is directed as the bucket moves downwardly and rearwardly at the bottom of the planting wheel. The lever 45 is arranged in the path of the bucket pivots 96, 97, so that as each bucket approaches its lower plant-setting position, the lever 45 is actuated to open valve 36 momentarily, so that a stream of water will be discharged from the spout 35. Fixed on the front of each bucket 94 above its spout 112 is a trough 113 into which the stream of water is discharged and by means of which the water is conducted into the spout 112. In this way, the spout 35 may be disposed directly in front of the planting wheel so as to discharge the water rearwardly, instead of being located alongside the planting wheel so as to discharge the water laterally.

Carried by vertical posts 114 fixed to and depending from the rear end of the sub-frame, are forwardly diverging covering elements 115 which are disposed at the rear of the planting wheel and in position to crowd earth toward the sides of each set plant and to pack the earth around the roots thereof as the machine travels ahead, thereby firmly maintaining the set plant in upright position.

In operation, the operators occupying the seats 53 are provided with supplies of plants which are placed on the trays 55. With the sub-frame in the lowered position of Figures 2 and 4, the clutch element 88 is engaged with clutch element 87 so that the planting wheel is driven in the direction of the arrow $a$ of Figure 2 when the machine is moved ahead. The operators then take turns in placing plants in the buckets 94, one plant being placed in each bucket as it moves upwardly at the rear of the planting wheel. When each bucket approaches the ground while moving downwardly and forwardly near the bottom of the planting wheel, the bucket pivot operates lever 45 so that a supply of water is delivered to each bucket immediately prior to setting of the plant in that bucket into the ground. When the bucket substantially reaches its lowermost position, its closure 104 is opened, and the pointed end of the bucket is in the ground so as to set the roots of the plant in the ground below the surface of the latter, the water in the bucket flowing onto and around the roots of the plant. As the planter moves ahead, the buckets move rearwardly and upwardly until they leave the set plant entirely without disturbing the same, and then the closure 104 of the bucket is allowed to close by gravity. Upon continued forward travel of the machine, the set plant is firmly held in set position by reason of the fact that the covering elements 115 promptly crowd earth toward the sides of and pack the same around the roots of the set plant.

From the foregoing, it is believed that the construction, operation and advantages of the present invention will be readily understood and appreciated by those skilled in the art. Modifications and changes in details of construction are contemplated, such as fairly fall within the spirit and scope of the invention as claimed.

What I claim as new is:

1. In a transplanting machine, a transverse front axle, a main frame supported on said axle and comprising side rails connected by a transverse rear rail and a transverse front tie rod, supporting and driving wheels on the ends of said front axle, caster wheels supporting the rear of said main frame, a transverse bar disposed about and journalled for rocking movement on said tie rod, a ground leveling plow supported by said bar, a sub-frame disposed within said main frame and journalled near its forward end on said front axle for vertical swinging movement, a planting wheel journalled on a transverse axis within said sub-frame rearwardly of said axle, a clutch-controlled driving connection between said axle and said planting wheel, means operatively connecting the forward end of said sub-frame with said bar whereby upward swinging of the sub-frame to raise the planting wheel to inoperative position will simultaneously turn said bar for raising the plow to an inoperative position, an operator's station on said main frame behind the planting wheel, and foot-operated means operable from the operator's station for swinging the sub-frame upwardly and releasably holding it in upwardly swung position.

2. The construction defined in claim 1, in combination with means operatively connected to said foot-operated means for automatically unclutching the driving connections between said axle and said planting wheel when the sub-frame is swung upwardly and for automatically clutching the same when the sub-frame is swung downwardly to lower the planting wheel and plow to operative position.

3. In a transplanting machine, a transverse front axle, a main frame supported on said axle and comprising side rails connected by a transverse rear rail and transverse front tie rod, supporting and driving wheels on the ends of said front axle, castor wheels supporting the rear of said main frame, a transverse bar disposed and journalled for rocking movement on said rod, a ground leveling plow supported by said bar, a sub-frame disposed within said main frame and journalled near its forward end on said front axle for vertical swinging movement, a planting wheel journalled on a transverse axis within said sub-frame rearwardly of said axle, a clutch-controlled driving connection between said front axle and said planting wheel, means operatively connecting the forward end of said sub-frame with said bar whereby upward swinging of the sub-frame to raise the planting wheel to inoperative position will simultaneously rock said bar for raising the plow to an inoperative position, operators' stations disposed in side-by-side relation on said main frame behind the planting wheel, and foot-operated means operable from either operator's station for swinging the sub-frame upwardly and releasably holding it in upwardly swung position.

4. The construction defined in claim 3, wherein said foot-operated means comprises a transverse rock shaft journalled on each side of the main frame, a bell crank lever fixed on each rock shaft and having a forwardly projecting arm provided at its free end with a roller bearing on the under side of the adjacent side member of the sub-frame, a transverse rock shaft journalled on the sub-frame rearwardly of said first-named rock shafts, a depending arm on each end of the last-named rock shaft operatively connected to the other arm of the bell crank lever at each side of the main frame, a rearwardly extending foot lever fixed to each first-named rock shaft and each having a pivoted pedal, and means controlled by each pedal for latching the associated foot lever in depressed position to hold the sub-frame in upwardly swung position.

5. The construction defined in claim 1, wherein the means operatively connecting the forward end of the sub-frame with the bar comprises arms rigid with and projecting forwardly from the sides of the sub-frame and having lateral forward ends, and forks rigid with and projecting rearwardly from the end portions of said bar, the lateral ends of said arms engaging between the members of said forks.

6. The construction defined in claim 1, wherein said foot-operated means comprises bell crank levers mounted on each side of the main frame and having corresponding arms thereof equipped with rollers bearing against the under side of the respective sides of the sub-frame, a rearwardly extending foot lever for operating each bell crank lever, an operating connection between said bell crank levers whereby both of the latter may be operated by either foot lever, each foot lever having a pivoted pedal, and means operated by either pedal for releasably latching the foot levers in depressed positions with the sub-frame in upwardly swung position.

7. The construction defined in claim 1, wherein said foot-operated means comprises bell crank levers mounted on each side of the main frame and having corresponding arms thereof equipped with rollers bearing against the under side of the respective sides of the sub-frame, a rearwardly extending foot lever for operating each bell crank lever, an operating connection between said bell crank levers whereby both of the latter may be operated by either foot lever, each foot lever having a pivoted pedal, and means operated by either pedal for releasably latching the foot levers in depressed positions with the sub-frame in upwardly swung position, and yieldable means for absorbing shock incident to lowering of the sub-frame.

8. The construction defined in claim 1, wherein said foot-operated means comprises bell crank levers mounted on each side of the main frame and having corresponding arms thereof equipped with rollers bearing against the under side of the respective sides of the sub-frame, a rearwardly extending foot lever for operating each bell crank lever, an operating connection between said bell crank levers whereby both of the latter may be operated by either foot lever, each foot lever having a pivoted pedal, and means operated by either pedal for releasably latching the foot levers in depressed positions with the sub-frame in upwardly swung position, a clutch member slidable on said axle and movable to one position to establish driving connection between the axle and the planting wheel and in the opposite direction to render said driving connection inoperative, and an operating connection between said clutch member and one of said bell crank levers whereby said driving connection is rendered inoperative when the sub-frame is swung upwardly and whereby the same is rendered operative when the sub-frame is allowed to swing downwardly.

CLAUDE L. CARELOCK.

REFERENCES CITED

The following references are of record in the file of this patent:

UNITED STATES PATENTS

| Number | Name | Date |
|---|---|---|
| 518,657 | Whitworth | Apr. 24, 1894 |
| 1,753,017 | Oppenheim | Apr. 1, 1930 |
| 1,802,273 | Richards et al. | Apr. 21, 1931 |
| 2,348,787 | Cordes | May 16, 1944 |